United States Patent
Dai et al.

(10) Patent No.: US 11,074,888 B2
(45) Date of Patent: Jul. 27, 2021

(54) IMAGE DATA PROCESSING METHOD AND APPARATUS, IMAGE DISPLAY METHOD AND APPARATUS, STORAGE MEDIUM AND DISPLAY DEVICE

(71) Applicant: BOE TECHNOLOGY GROUP CO., LTD., Beijing (CN)

(72) Inventors: Bin Dai, Beijing (CN); Yanhui Xi, Beijing (CN); Xiaomang Zhang, Beijing (CN); Yue Li, Beijing (CN); Zhihua Ji, Beijing (CN); Tiankuo Shi, Beijing (CN); Yuxin Bi, Beijing (CN); Lingyun Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/641,908

(22) PCT Filed: Apr. 19, 2019

(86) PCT No.: PCT/CN2019/083483
§ 371 (c)(1),
(2) Date: Feb. 25, 2020

(87) PCT Pub. No.: WO2019/206047
PCT Pub. Date: Oct. 31, 2019

(65) Prior Publication Data
US 2020/0193934 A1    Jun. 18, 2020

(30) Foreign Application Priority Data
Apr. 28, 2018 (CN) .......................... 201810399787.1

(51) Int. Cl.
*G09G 5/02* (2006.01)
*G09G 3/20* (2006.01)
(Continued)

(52) U.S. Cl.
CPC ........... *G09G 5/026* (2013.01); *G09G 3/2003* (2013.01); *G09G 2320/0646* (2013.01); *G09G 2320/0666* (2013.01)

(58) Field of Classification Search
USPC ........................................................ 345/204
See application file for complete search history.

(56) References Cited

U.S. PATENT DOCUMENTS 9,183,787 B2    11/2015  Botzas et al.
2005/0225561 A1*  10/2005  Higgins ................... G09G 5/02
                                                    345/600
(Continued)

FOREIGN PATENT DOCUMENTS

CN    103514585 A    1/2014
CN    103928012 A    7/2014
(Continued)

OTHER PUBLICATIONS

International Search Report of PCT/CN2019/083483 in Chinese, dated Jun. 27, 2019, with English translation.

*Primary Examiner* — Chineyere D Wills-Burns
(74) *Attorney, Agent, or Firm* — Collard & Roe, P.C.

(57) ABSTRACT

An image data processing method and apparatus, an image display method and apparatus, and a computer-readable storage medium and a display device. The image data processing method includes: obtaining initial image data of a to-be-displayed image, wherein each pixel in the to-be-displayed image comprises a white sub-pixel and a plurality of color sub-pixels; determining a target stimulus value corresponding to each pixel based on the initial image data, wherein the target stimulus value corresponding to each pixel is negatively correlated with color saturation of each pixel; and updating the initial image data to obtain target image data, wherein a stimulus value of the white sub-pixel (Continued)

of each pixel in the target image data is the target stimulus value corresponding to each pixel.

20 Claims, 6 Drawing Sheets

(51) Int. Cl.
  *H04N 9/64* (2006.01)
  *H04N 9/73* (2006.01)
  *G09G 3/36* (2006.01)
  *G09G 3/3208* (2016.01)
  *G09G 3/34* (2006.01)

(56) References Cited

U.S. PATENT DOCUMENTS

| | | | | |
|---|---|---|---|---|
| 2005/0259111 | A1* | 11/2005 | Dowling | G09G 3/2003 345/593 |
| 2013/0155120 | A1* | 6/2013 | Kang | H04N 9/73 345/690 |
| 2014/0071189 | A1* | 3/2014 | Park | G09G 3/2074 345/694 |
| 2014/0267442 | A1* | 9/2014 | Lin | G09G 3/3208 345/690 |
| 2015/0310794 | A1* | 10/2015 | Gille | H04N 9/73 345/594 |
| 2015/0312539 | A1* | 10/2015 | Wu | G09G 3/3208 345/694 |
| 2016/0180807 | A1* | 6/2016 | Chen | G09G 5/02 345/591 |
| 2016/0189589 | A1 | 6/2016 | Jin et al. | |
| 2016/0253942 | A1* | 9/2016 | Tseng | G09G 3/2003 345/601 |
| 2020/0193934 | A1 | 6/2020 | Dai et al. | |

FOREIGN PATENT DOCUMENTS

| | | |
|---|---|---|
| CN | 104269138 A | 1/2015 |
| CN | 104486608 A | 4/2015 |
| CN | 108615496 A | 10/2018 |

\* cited by examiner

IMAGE DATA PROCESSING METHOD AND APPARATUS, IMAGE DISPLAY METHOD AND APPARATUS, STORAGE MEDIUM AND DISPLAY DEVICE

CROSS-REFERENCE TO RELATED APPLICATION

This application is the National Stage of PCT/CN2019/083483 filed on Apr. 19, 2019, which claims priority under 35 U.S.C. §119 of Chinese Application No. 201810399787.1 filed on Apr. 28, 2018, the disclosure of which is incorporated by reference.

TECHNICAL FIELD

Embodiments of the present disclosure relate to an image data processing method and apparatus, an image display method and apparatus, a storage medium and a display device.

BACKGROUND

With the development of science and technology, display devices are widely used, and the display device generally includes a display panel.

The display device adopts a display panel having a red-green-blue-white (RGBW) pixel structure. A pixel unit in the display panel having the RGBW pixel structure has one more transparent sub-pixel than an ordinary pixel unit, while the ordinary pixel unit includes: a red sub-pixel, a green sub-pixel, and a blue sub-pixel. Moreover, in the display panel having the RGBW pixel structure, the light emitted by the backlight source may pass through the transparent sub-pixel, and when the backlight source emits white light, the transparent sub-pixel may also emit white light.

SUMMARY

At least one embodiment of the present disclosure provides an image data processing method, which includes:
obtaining initial image data of a to-be-displayed image, wherein each pixel in the to-be-displayed image includes a white sub-pixel and a plurality of color sub-pixels;
determining a target stimulus value corresponding to each pixel based on the initial image data, wherein the target stimulus value corresponding to each pixel is negatively correlated with color saturation of each pixel; and
updating the initial image data to obtain target image data, wherein a stimulus value of the white sub-pixel of each pixel in the target image data is the target stimulus value corresponding to each pixel.

Optionally, prior to updating the initial image data to obtain the target image data, the method further includes:
determining an auxiliary stimulus value corresponding to each color sub-pixel in each pixel, wherein the auxiliary stimulus value corresponding to each color sub-pixel is less than a stimulus value of each color sub-pixel in the initial image data; and a stimulus value of each color sub-pixel in the target image data is the auxiliary stimulus value corresponding to each color sub-pixel.

Optionally, wherein the determining the target stimulus value corresponding to each pixel based on the initial image data includes:
obtaining a stimulus value of each color sub-pixel in each pixel in the initial image data; determining a maximum initial stimulus value M and a minimum initial stimulus value C of the color sub-pixels in each pixel;
determining a color saturation coefficient K of each pixel based on a color difference of each pixel, wherein the color saturation coefficient K of each pixel is negatively correlated with the color difference of each pixel, and the color difference of each pixel is positively related to the color saturation of each pixel; and
determining the target stimulus value F corresponding to each pixel according to a first preset formula, wherein the first preset formula is $$F = \frac{C^2}{M}K.$$

Optionally, the determining the color saturation coefficient K of each pixel based on the color difference of each pixel includes:
determining the color saturation coefficient K of each pixel according to a second preset formula, wherein the second preset formula is:

$$K = 1 - \frac{S}{S\max},$$

where S is the color difference of each pixel, and Smax is a maximum color difference of pixels in the to-be-displayed image.

Optionally, the determining the auxiliary stimulus value corresponding to each color sub-pixel in each pixel includes:
determining the auxiliary stimulus value G corresponding to each color sub-pixel according to a third preset formula, wherein the third preset formula is $$G = E - F \times \left(\frac{S}{S\max}\right),$$

where E is the stimulus value of each color sub-pixel in the initial image data, and S is the color difference of each pixel, Smax is a maximum color difference of pixels in the to-be-displayed image, and F is the target stimulus value.

Optionally, the image data processing method according to at least one embodiment of the present disclosure further includes:
performing a white balance adjustment on the target image data.

At least one embodiment of the present disclosure further provides an image display method, which includes:
displaying the to-be-displayed image based on the target image data obtained by any one of the above-mentioned image data processing method.

At least one embodiment of the present disclosure further provides an image data processing apparatus, which includes:
an obtaining module, configured to obtain initial image data of a to-be-displayed image, wherein each pixel in the to-be-displayed image includes a white sub-pixel and a plurality of color sub-pixels;
a first determining module, configured to determine a target stimulus value corresponding to each pixel based on the initial image data, wherein the target stimulus value corresponding to each pixel is negatively correlated with the color saturation of each pixel; and an updating module, configured to update the initial image data to obtain target image data, wherein a stimulus value of the white sub-pixel of each pixel in the target image data is the target stimulus value corresponding to each pixel.

Optionally, the apparatus further includes:
a second determining module, configured to determine an auxiliary stimulus value corresponding to each color sub-pixel in each pixel, wherein the auxiliary stimulus value corresponding to each color sub-pixel is less than a stimulus value of each color sub-pixel in the initial image data; and
a stimulus value of each color sub-pixel in the target image data is the auxiliary stimulus value corresponding to each color sub-pixel.

Optionally, the first determining module includes:
an obtaining unit, configured to obtain a stimulus value of each color sub-pixel in each pixel in the initial image data;
a first determining unit, configured to determine a maximum initial stimulus value M and a minimum initial stimulus value C of the color sub-pixels in each pixel;
a second determining unit, configured to determine a color saturation coefficient K of each pixel based on a color difference of each pixel, wherein the color saturation coefficient K of the pixel is negatively related to the color difference of the pixel, and the color difference of the pixel is positively related to the color saturation of the pixel; and
a third determining unit, configured to determine the target stimulus value F corresponding to each pixel according to a first preset formula, wherein the first preset formula is $$F = \frac{C^2}{M}K.$$

Optionally, the second determining unit is further configured to determine the color saturation coefficient K of each pixel according to a second preset formula, wherein the second preset formula is $$K = 1 - \frac{S}{S\max},$$

where S is the color difference of each pixel, Smax is a maximum color difference of the pixels in the to-be-displayed image.

Optionally, the apparatus according to at least one embodiment of the present disclosure further includes:
an adjusting unit, configured to perform a white balance adjustment on the target image data.

At least one embodiment of the present disclosure further provides an image display apparatus, configured to display the to-be-displayed image based on the target image data obtained by the image data processing method according to any one of the above-mentioned image data processing method.

At least one embodiment of the present disclosure further provides an image data processing apparatus, which includes:
a processor; and
a memory,
wherein the memory stores computer-readable instructions executable by the processor, and the computer-readable instructions, when executed, cause the processor to perform following operations:

obtaining initial image data of a to-be-displayed image, wherein each pixel in the to-be-displayed image includes a white sub-pixel and a plurality of color sub-pixels;
determining a target stimulus value corresponding to each pixel based on the initial image data, wherein the target stimulus value corresponding to each pixel is negatively correlated with color saturation of each pixel; and
updating the initial image data to obtain target image data, wherein a stimulus value of the white sub-pixel of each pixel in the target image data is the target stimulus value corresponding to each pixel.

At least one embodiment of the present disclosure further provides a non-volatile computer-readable storage medium, storing a computer-readable program executable by a processor, wherein the computer-readable program, when executed by the processor, causes the processor to perform the above-mentioned image data processing method.

At least one embodiment of the present disclosure further provides a display device, which includes any one of the above-mentioned image data processing apparatus.

At least one embodiment of the present disclosure further provides a display device, which includes any one of the above-mentioned image display apparatus.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

With the development of science and technology, display devices are widely used, and the display device generally includes a display panel. The display device adopts a display panel with an RGBW pixel structure.

Figure 1:
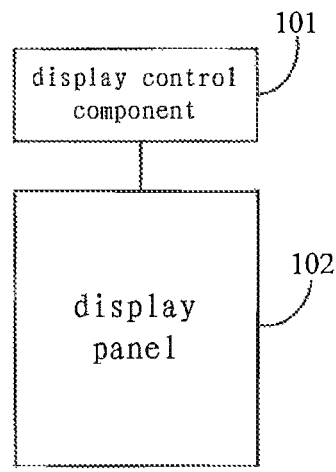
FIG. 1 is a schematic diagram of an implement environment related to an image data processing method provided by at least some embodiments of the present disclosure.

FIG. 1 is a schematic diagram of an implement environment related to an image data processing method provided by at least some embodiments of the present disclosure. As shown in FIG. 1, the implement environment may include a display control component 101 and a display panel 102 with an RGBW pixel structure, and the display control component 101 is connected with the display panel 102.

It should be noted that the display panel 102 as shown in FIG. 1 may be: any product or component having a display function such as a liquid crystal panel, an electronic paper, an organic light emitting diode panel, a mobile phone, a tablet computer, a television set, a display, a notebook computer, a digital photo frame and a navigator. And the display control component 101 may be a component with possessing and control functions, such as a display chip.

Figure 2:
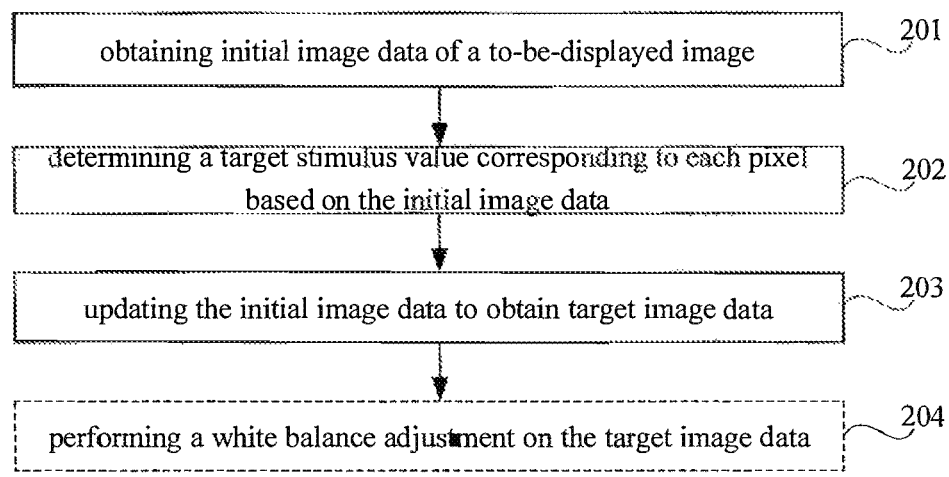
FIG. 2 is a flow chart of an image data processing method provided by at least some embodiment of the present disclosure.

FIG. 2 is a flow chart of an image data processing method provided by at least some embodiments of the present disclosure, and the image data processing method may be applied to the display control component 101 in FIG. 1, as shown in FIG. 2, the image data processing method may include:

Step 201, obtaining initial image data of a to-be-displayed image.

Each pixel in the to-be-displayed image includes a white sub-pixel and a plurality of color sub-pixels.

Step 202, determining a target stimulus value corresponding to each pixel based on the initial image data.

The target stimulus value corresponding to a pixel is negatively correlated to the color saturation of the pixel.

Step 203, updating the initial image data to obtain target image data.

The stimulus value of the white sub-pixel of each pixel in target image data is the target stimulus value corresponding to the pixel.

In some embodiments, the image data processing method further includes: Step 204, performing a white balance adjustment on the target image data.

In summary, in the image data processing method provided by at least some embodiments of the present disclosure, after obtaining the initial image data of to-be-displayed image, the stimulus value of the white sub-pixel of each pixel is determined according to the initial image data, and the initial image data is updated to obtain the target image data including the stimulus value of the white sub-pixel, and the stimulus value of the white sub-pixel is negatively correlated to the color saturation of the pixel. That is, in the to-be-displayed image displayed according to the target image data, the light emission amount of the white sub-pixel in the pixel with higher color saturation is smaller, and the color fading effect is weak, while the light emission amount of the white sub-pixel in the pixel with lower color saturation is greater, and the color fading effect is strong. The color contrast of the display panel is improved, and the display effect of the display panel is improved.

Figure 3:
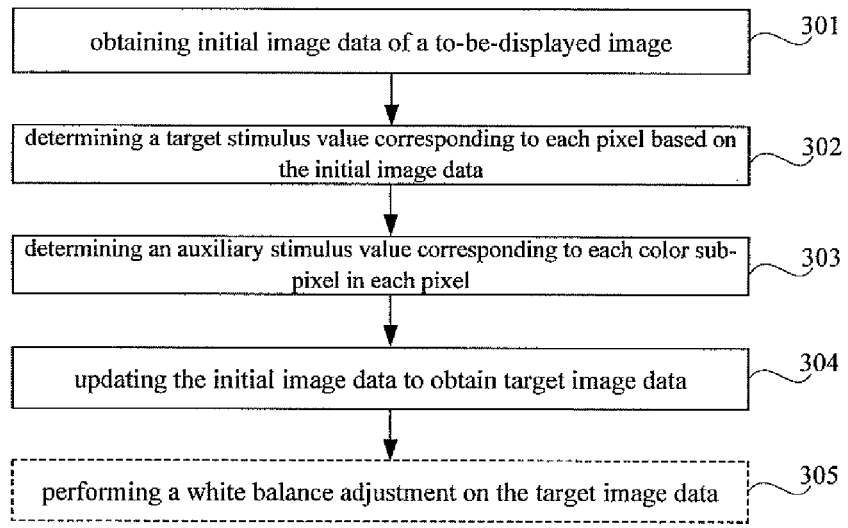
FIG. 3 is a flow chart of another image data processing method provided by at least some embodiment of the present disclosure.

FIG. 3 is a flow chart of another image data processing method provided by at least some embodiments of the present disclosure, and the image data processing method may be applied to the display control component 101 in FIG. 1. As shown in FIG. 3, the image data processing method may include:

Step 301, obtaining initial image data of a to-be-displayed image.

Each pixel in to-be-displayed image includes a white sub-pixel and a plurality of color sub-pixels. For example, the plurality of color sub-pixels may include sub-pixels of three colors of red, blue and green. In practical applications, the plurality of color sub-pixels may include sub-pixels of at least one color among the three colors, or sub-pixels of other colors, which is not limited in at least some embodiments of the present disclosure.

Step 302, determining a target stimulus value corresponding to each pixel based on the initial image data.

The target stimulus value corresponding to the pixel and the color saturation of the pixel are in negative correlation with each other.

Figure 4:
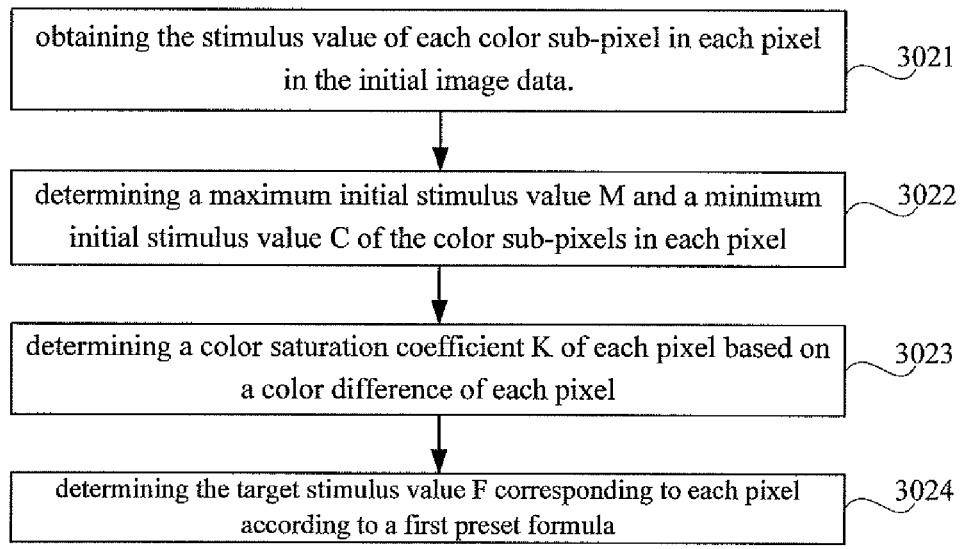
FIG. 4 is a flow chart of a process of determining a target stimulus value corresponding to each pixel provided by at least some embodiments of the present disclosure.

For example, FIG. 4 is a flow chart of a process of determining the target stimulus value corresponding to each pixel provided by at least some embodiments of the present disclosure. As shown in FIG. 4, Step 302 may include:

Step 3021, obtaining the stimulus value of each color sub-pixel in each pixel in the initial image data. For example, in Step 3021, the stimulus value of the red sub-pixel in each pixel, the stimulus value of the blue sub-pixel in each pixel, and the stimulus value of the green sub-pixel in each pixel may be obtained, it should be noted that the range of the stimulus value of the color sub-pixel is 0 to 255. The stimulus value of the pixel is equivalent to the grey scale value of the pixel.

Step 3022, determining a maximum initial stimulus value M and a minimum initial stimulus value C of the color sub-pixels in each pixel.

For example, if the stimulus value of the red sub-pixel in the pixel is 200, the stimulus value of the blue sub-pixel is 100, and the stimulus value of the green sub-pixel is 50, the maximum initial stimulus value M of the color sub-pixels in the pixel may be determined to be 200, and the minimum initial stimulus value C is 50.

Step 3023, determining a color saturation coefficient K of each pixel based on a color difference of each pixel.

The color saturation coefficient K of the pixel is negatively correlated with the color difference of the pixel, and the color difference of the pixel is positively correlated with the color saturation of the pixel, that is, the color saturation coefficient K is negatively correlated with the color saturation of the pixel.

For example, in Step 3023, the color saturation coefficient K of each pixel may be determined according to a second preset formula, and the second preset formula is:

$$K = 1 - \frac{S}{S\max},$$

where S is the color difference of the pixel, Smax is the maximum color difference of the pixels in to-be-displayed image.

The color difference S of the pixel may be determined according to the fourth preset formula, and the fourth preset formula may be: $S=\sqrt{L_2+N^2}$, here L is the red density offset of the pixel, and N is the blue density offset of the pixel.

Figure 5:
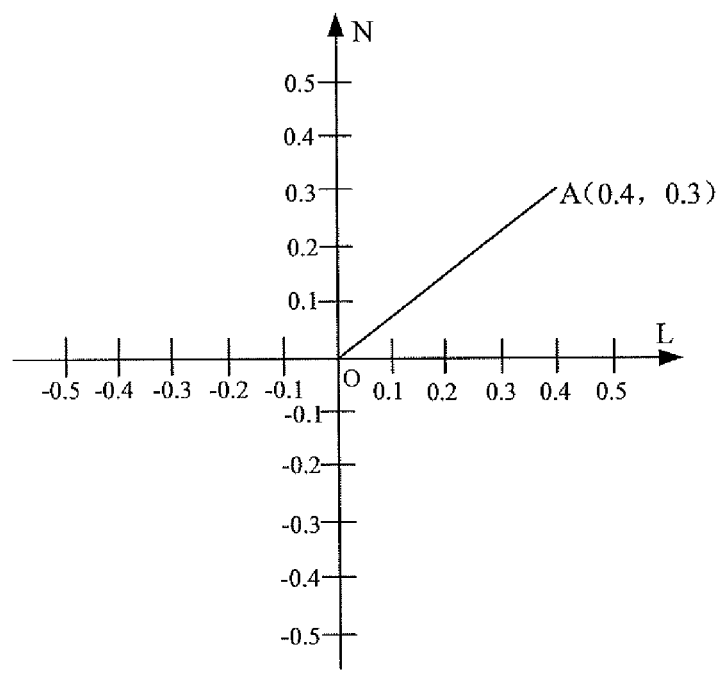
FIG. 5 is a schematic diagram of a pixel density offset coordinate system provided by at least some embodiments of the present disclosure.

It should be noted that the color difference of the pixel may be expressed by means of a density offset coordinate system of the pixel. For example, FIG. 5 is a schematic diagram of the density offset coordinate system of the pixel provided by at least some embodiments of the present disclosure. As shown in FIG. 5, the origin O of the density offset coordinate system represents colorless point, the horizontal axis represents the blue density offset L of the pixel, and the vertical axis represents the red density offset N of the pixel. According to the blue density offset L and red density offset N of a pixel, a corresponding point of the pixel in the coordinate system may be determined, for example, when the blue density offset L of a pixel is 0.4, and the red density offset N is 0.3, the A point in the coordinate system may be determined according to the L and N, and the coordinates of the A point are (0.4, 0.3). The length of the line segment OA may represent the size of the color difference S of the pixel, and the longer the length of the line segment OA, the larger the color difference S of the pixel, the higher the color saturation of the pixel, and the smaller the color saturation coefficient K.

The red density offset L and blue density offset N of the pixel may be determined according to the fifth preset formula. The fifth preset formula may be:

$$\begin{pmatrix} Y \\ N \\ L \end{pmatrix} = \begin{pmatrix} \partial_R & \partial_G & \partial_B \\ \gamma_R & \gamma_G & \gamma_B \\ \mu_R & \mu_G & \mu_B \end{pmatrix} \begin{pmatrix} H \\ I \\ J \end{pmatrix},$$

where Y is the brightness value of the pixel, $$\begin{pmatrix} \partial_R & \partial_G & \partial_B \\ \gamma_R & \gamma_G & \gamma_B \\ \mu_R & \mu_G & \mu_B \end{pmatrix}$$

is the transformation matrices, H is the stimulus value of the red sub-pixel, I is the stimulus value of the green sub-pixel, and J is the stimulus value of the blue sub-pixel, and $\partial_R+\partial_G+\partial_B=1$, $\gamma_R+\gamma_G+\gamma_B=0$, $\mu_R+\mu_G+\mu_B=0$.

It should be noted that when the obtained initial image data of the to-be-displayed image is data in a high definition television (English: High Definition Television, abbreviation: HDTV) mode, $\partial_R$, $\partial_G$, $\partial_B$, $\gamma_R$, $\gamma_G$, and $\mu_R$ may be 0.299, 0.587, 0.114, −0.1687, −0.3313, 0.5, 0.5, −0.4187 and −0.0813 in turn. When the obtained initial image data of the to-be-displayed image is data of Standard Definition Television (English: Standard Definition Television, abbreviation: SDTV) mode, $\partial_R$, $\partial_G$, $\partial_B$, $\gamma_R$, $\gamma_G$, $\gamma_B$, $\mu_R$, $\mu_G$ and $\mu_R$ may be 0.2126, 0.587, 0.114, −0.1687, −0.3313, 0.5, 0.5, −0.4187 and −0.0813 in turn.

Step 3024, determining the target stimulus value F corresponding to each pixel according to a first preset formula.

The first preset formula may be:

$$F = \frac{C^2}{M}K.$$

It should be noted that when the color gamut corresponding to the obtained initial stimulus value of the pixel is on the vertices of the standard red green blue (Standard Red Green Blue, abbreviation: sRGB) color gamut diagram and the connection lines between the vertices, the target stimulus value F determined by the first preset formula is equal to zero.

Figure 6:
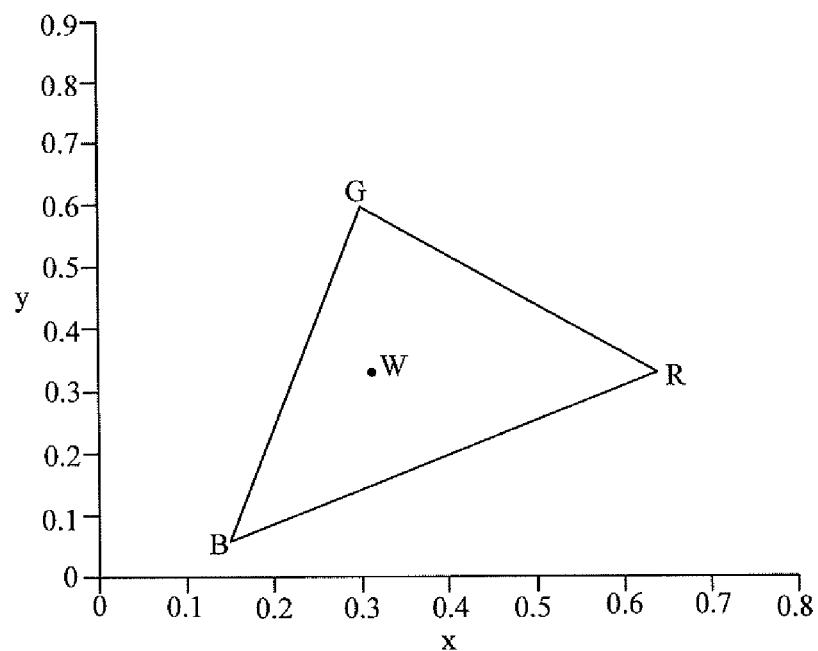
FIG. 6 is a sRGB color gamut diagram provided by at least some embodiments of the present disclosure.

For example, FIG. 6 is a sRGB color gamut diagram provided by at least some embodiments of the present disclosure. As shown in FIG. 6, the sRGB color gamut diagram is composed of a triangular area bounded by line segments BG, GR, and BR, and the sRGB color gamut diagram includes the white color gamut point (also called white point) W.

It should be noted that each color gamut point in the sRGB color gamut diagram may correspond to the stimulus values of the red sub-pixel, green sub-pixel and blue sub-pixel. The stimulus values of the red, green, and blue sub-pixels corresponding to the white point W in the sRGB color gamut diagram are all 255; the stimulus values of the red sub-pixel, blue sub-pixel, and green sub-pixel corresponding to the vertex R (the point is a pure red color gamut point) are: 255, 0, and 0; the stimulus values of the red sub-pixel, green sub-pixel, and blue sub-pixel corresponding to the vertex G (the point is a pure green color gamut point) are: 0, 255, and 0; the stimulus values of the red sub-pixel, green sub-pixel, and blue sub-pixel corresponding to the vertex B (the point is a pure blue color gamut point) are: 0, 0, and 255. The stimulus values of the blue sub-pixels corresponding to the color gamut points on the line between the vertices R and G are 0; the stimulus values of the green sub-pixels corresponding to the color gamut points on the line between the vertices R and B are 0; the stimulus values of the red sub-pixels corresponding to the color gamut points on the line between the vertices R and G are 0. That is, the minimum stimulus value C corresponding to the vertexes on the sRGB color gamut diagram and the color gamut points on the lines between the vertices is 0, and the target stimulus value F determined according to the minimum stimulus value C and the first preset formula is 0. Since the color saturation of the pixels corresponding to the vertexes on the sRGB color gamut diagram and the color gamut points on the lines connecting the vertices is the highest, and the color of the pixel has no fading effect, the color contrast of the display panel is further improved.

Step 303, determining an auxiliary stimulus value corresponding to each color sub-pixel in each pixel.

The auxiliary stimulus value corresponding to each color sub-pixel is less than the stimulus value of the color sub-pixel in the initial image data.

For example, in Step 303, the auxiliary stimulus value G corresponding to the color sub-pixel may be determined according to a third preset formula, and the third preset formula is:

$$G = E - F \times \left(\frac{S}{Smax}\right).$$

where E is the stimulus value of the color sub-pixel in the initial image data, S is the color difference of the pixel where the color sub-pixel is located, Smax is the maximum color difference of the pixels in the to-be-displayed image, and F is the target stimulus value.

Step 304, updating the initial image data to obtain target image data.

For example, in Step 304, the target stimulus value corresponding to the pixel determined in Step 302 may be used as the stimulus value of the white sub-pixel of the pixel, and the auxiliary stimulus value corresponding to the color sub-pixel determined in Step 303 may be used as the stimulus value of the color sub-pixel to obtain the target image data. Since the stimulus value of the color sub-pixel in the target image data is less than the stimulus value of the color sub-pixel in the initial image data, and the stimulus value of the color sub-pixel is positively related to the brightness of the color sub-pixel, that is, the brightness of the image displayed by the display panel according to the target image data is less than the brightness of the image displayed according to the initial image data. Therefore, it is possible to avoid a glaring phenomenon due to the brightness of the image displayed on the display panel being too bright, and improve the display effect of the display panel.

In some embodiments, the image data processing method as shown in FIG. 3 may also include Step 305 of performing a white balance adjustment on the target image data.

For example, the balance adjustment may be performed on the target image data, so that the to-be-displayed image may be displayed according to the target image data after the white balance adjustment. For example, after performing the white balance adjustment on the target image data, the color temperature of each pixel in the target image data may be 6500 kelvin. In practical applications, the color temperature of each pixel in the target image data may also be other color temperatures, for example, the color temperature of each pixel in the target image data is 7500 Kelvin, which is not limited in the embodiments of the present disclosure.

In summary, in the image data processing method provided by at least some embodiments of the present disclosure, after obtaining the initial image data of to-be-displayed image, the stimulus value of the white sub-pixel of each pixel is determined according to the initial image data, and the initial image data is updated to obtain the target image data including the stimulus value of the white sub-pixel, and the stimulus value of the white sub-pixel is negatively related to the color saturation of the pixel. That is, in the to-be-displayed image displayed according to the target image data, the light emission amount of the white sub-pixel in the pixel with higher color saturation is smaller, and the color fading effect is weak, while the light emission amount of the white sub-pixel in the pixel with lower color saturation is larger, and the color fading effect is strong. The color contrast of the display panel is improved, and the display effect of the display panel is improved.

At least some embodiment of the present disclosure also provides an image display method, which includes: displaying the to-be-displayed image based on the target image data obtained by the image data processing method described above. The image display method may be applied to, for example, the display panel 102 as shown in FIG. 1, but the embodiment of the present disclosure is not limited thereto.

Figure 7:
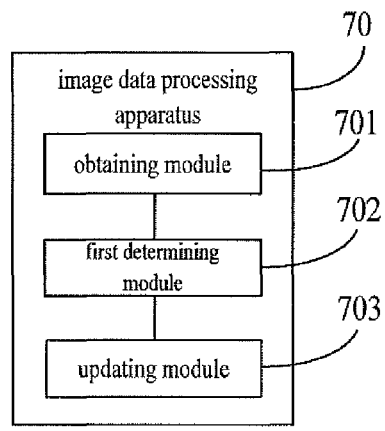
FIG. 7 is a schematic diagram of an image data processing apparatus provided by at least some embodiments of the present disclosure.

FIG. 7 is a schematic diagram of an image data processing apparatus provided by at least some embodiments of the present disclosure. As shown in FIG. 7, an image data processing apparatus 70 may include:

An obtaining module 701, configured to obtain initial image data of a to-be-displayed image.

Each pixel in to-be-displayed image includes a white sub-pixel and a plurality of color sub-pixels.

A first determining module 702, configured to determine a target stimulus value corresponding to each pixel based on the initial image data.

The target stimulus value corresponding to the pixel is negatively correlated with the color saturation of the pixel.

An updating module 703, configured to update the initial image data to obtain target image data.

The stimulus value of white sub-pixel of each pixel in a target image data is the target stimulus value corresponding to each pixel.

In some embodiments, the obtaining module 701 may be implemented by hardware having an input function, such as a keyboard, a mouse, a touch screen, and a microphone, or may read the initial image data from a memory (such as a read-only memory or a random access memory) that stores the initial image data or from a network (such as the internet), which is not limited in the embodiments of the present disclosure. In summary, in the image data processing apparatus provided by at least some embodiments of the present disclosure, after the obtaining module obtains the initial image data of the to-be-displayed image, the first determining module determines the stimulus value of the white sub-pixel of each pixel according to the initial image data, and the updating module updates the initial image data to obtain the target image data including the stimulus value of the white sub-pixel, and the stimulus value of the white sub-pixel is negatively correlated to the color saturation of the pixel. That is, in the to-be-displayed image displayed by the display module according to the target image data, the light emission amount of the white sub-pixel in the pixel with higher color saturation is smaller, and the color fading effect is weak, while the light emission amount of the white sub-pixel in the pixel with lower color saturation is larger, and the color fading effect is strong. The color contrast of the display panel is improved, and the display effect of the display panel is improved.

Figure 8:
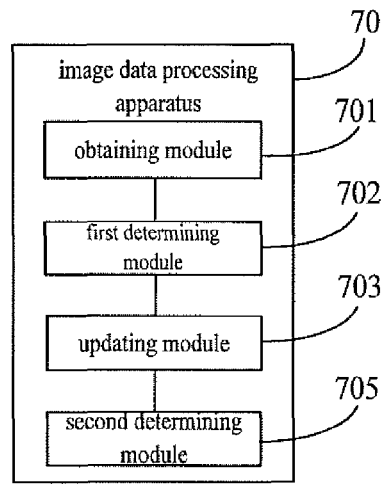
FIG. 8 is a schematic diagram of another image data processing apparatus provided by at least some embodiments of the present disclosure.

FIG. 8 is a schematic diagram of another image data processing apparatus provided by at least some embodiments of at present disclosure. As shown in FIG. 8, based on FIG. 7, the image data processing apparatus 70 may also include:

A second determining module 705, configured to determine an auxiliary stimulus value corresponding to each color sub-pixel in each pixel.

The auxiliary stimulus value corresponding to each color sub-pixel is less than the stimulus value of each color sub-pixel in the initial image data, and the stimulus value of each color sub-pixel in the target image data is the auxiliary stimulus value corresponding to each color sub-pixel.

For example, the second determining module 705 is further configured to: determine an auxiliary stimulus value G corresponding to each color sub-pixel according to the third preset formula. The third preset formula may be:

$$G = E - F \times \left(\frac{S}{Smax}\right),$$

where E is stimulus value of each color sub-pixel in initial image data, S is the color difference of each pixel, Smax is the maximum color difference of the pixels in each to-be-displayed image, and F is the target stimulus value.

In some embodiments, the second determining module 705 may be implemented by, for example, an adder, a multiplier, and the like, and the embodiments of the present disclosure are not limited thereto.

Figure 9:
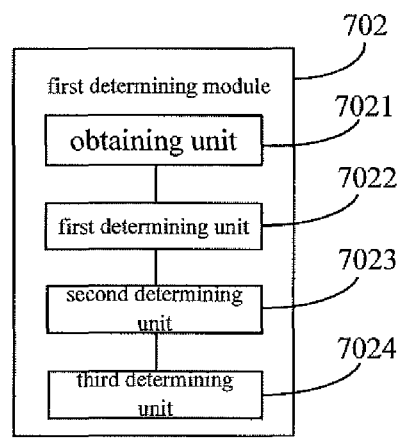
FIG. 9 is a schematic diagram of a first determining module provided by at least some embodiments of the present disclosure.

FIG. 9 is a schematic diagram of the first determining module provided by at least some embodiments of the present disclosure. As shown in FIG. 9, the first determining module 702 may include:

An obtaining unit 7021, configured to obtain a stimulus value of each color sub-pixel in each pixel in initial image data.

A first determining unit 7022, configured to determine a maximum initial stimulus value M and a minimum initial stimulus value C of the color sub-pixels in each pixel.

A second determining unit 7023, configured to determine a color saturation coefficient K of each pixel based on a color difference of each pixel.

The color saturation coefficient K of the pixel is negatively correlated with the color difference of the pixel, and the color difference of the pixel is positively correlated with the color saturation of the pixel.

Optionally, the second determining unit 7023 may be further configured to: determine the color saturation coefficient K of each pixel according to the second preset formula, and the second preset formula is:

$$K = 1 - \frac{S}{Smax},$$

S is a color difference of each pixel, Smax is a maximum color difference of the pixels in to-be-displayed image.

A third determining unit 7024, configured to determine the target stimulus value F corresponding to each pixel according to the first preset formula, and the first preset formula is:

$$F = \frac{C^2}{M} K.$$

In some embodiments, similar to the obtaining module 701, the obtaining unit 7021 may also be implemented by hardware having an input function, such as a keyboard, a mouse, a touch screen, and a microphone, or may read the initial image data from a memory (such as a read-only memory or a random access memory) or the like that stores the initial image data, or from a network (such as the Internet), which is not limited in the embodiments of the present disclosure.

In some embodiments, the second determining unit 7023 may be implemented by, for example, an adder, a multiplier, and the like, and the third determination unit 7024 may be implemented by, for example, a multiplier or the like, which is not limited in the embodiments of the present disclosure.

Figure 10:
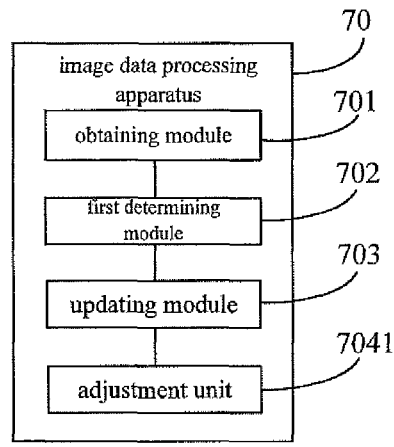
FIG. 10 is a schematic diagram of a display module provided by at least some embodiments of the present disclosure.

FIG. 10 is a schematic diagram of a display module provided by at least some embodiments of at present disclosure. As shown in FIG. 10, based on FIG. 7, the image data processing apparatus 70 may also include:

An adjustment unit 7041, configured to perform a white balance adjustment on the target image data.

In summary, in the image data processing apparatus provided by at least some embodiments of the present disclosure, after the obtaining module obtains the initial image data of the to-be-displayed image, the first determining module determines the stimulus value of the white sub-pixel of each pixel according to the initial image data, and the updating module updates the initial image data to obtain the target image data including the stimulus value of the white sub-pixel, and the stimulus value of the white sub-pixel is negatively correlated to the color saturation of the pixel. That is, in the to-be-displayed image displayed according to the target image data, the light emission amount of the white sub-pixel in the pixel with higher color saturation is smaller, and the color fading effect is weak, while the light emission amount of the white sub-pixel in the pixel with lower color saturation is larger, and the color fading effect is strong. The color contrast of the display panel is improved, and the display effect of the display panel is improved.

At least one embodiment of the present disclosure also provides an image display apparatus which is configured to: display the to-be-displayed image based on the target image data obtained by any one of the image data processing methods described above.

In some embodiments, the image display apparatus may be the display panel with an RGBW pixel structure. For example, the image display apparatus may be implemented as the display panel 102 as shown in FIG. 1, however, it could be understood that the embodiment of the present disclosure is not limited thereto.

Figure 11:
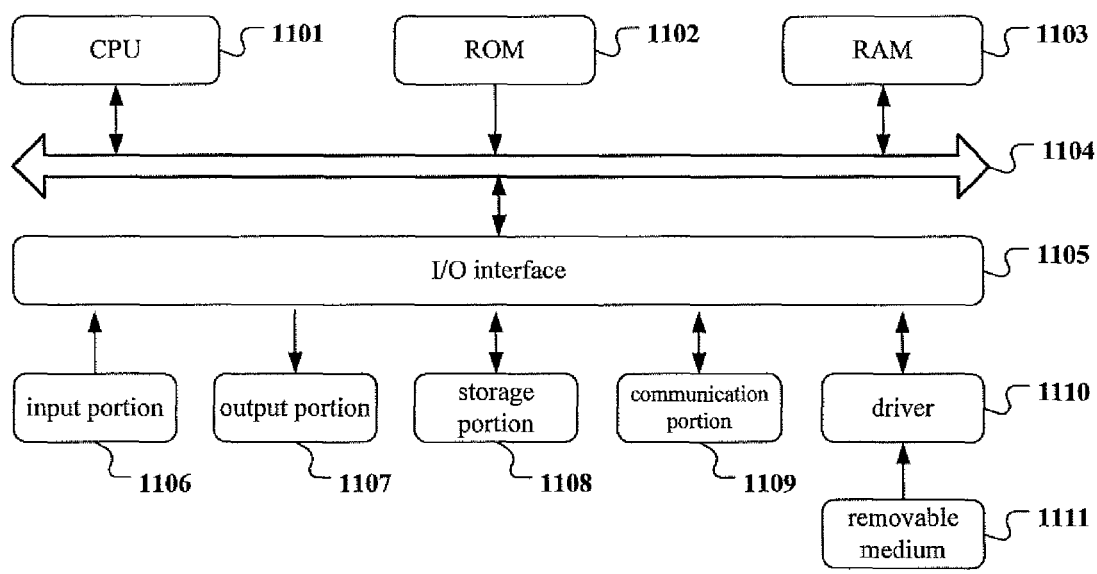
FIG. 11 is a schematic diagram of a computer system adapted for achieving an image data processing method or device according to at least some embodiments of the present disclosure.

Referring to FIG. 11, a schematic structural diagram of a computer system 1100 adapted to implement an image data processing method according to at least some embodiments of the present application is shown.

As shown in FIG. 11, the computer system 1100 includes a central processing unit (CPU) 1101, which may execute various appropriate actions and processes in accordance with a program stored in a read-only memory (ROM) 1102 or a program loaded into a random access memory (RAM) 1103 from a storage portion 1108. The RAM 1103 also stores various programs and data required by operations of the system 1100. The CPU 1101, the ROM 1102 and the RAM 1103 are connected to each other through a bus 1104. An input/output (I/O) interface 1105 is also connected to the bus 1104.

The following components are connected to the I/O interface 1105: an input portion 1106 including a keyboard, a mouse, an imaging apparatus such as a camera etc.; an output portion 1107 comprising a cathode ray tube (CRT), a liquid crystal display device (LCD), a speaker etc.; a storage portion 1108 including a hard disk and the like; and a communication portion 1109 comprising a network interface card, such as a LAN card and a modem. The communication portion 1109 performs communication processes via a network, such as the Internet. A driver 1110 is also connected to the I/O interface 1105 as required. A removable medium 1111, such as a magnetic disk, an optical disk, a magneto-optical disk, and a semiconductor memory, may be installed on the driver 1110, to facilitate the retrieval of a computer program from the removable medium 1111, and the installation thereof on the storage portion 1108 as required.

In particular, according to an embodiment of the present disclosure, the process described above with reference to FIG. 2 to FIG. 4 may be implemented in a computer software program. For example, an embodiment of the present disclosure includes a computer program product, which comprises a computer program that is tangibly embedded in a machine-readable medium. The computer program comprises program codes for executing the method of FIG. 2 to FIG. 4. In such an embodiment, the computer program may be downloaded and installed from a network via the communication portion 1109, and/or may be installed from the removable media 1111.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules in the description of the embodiments of the present application may be implemented in software or hardware. For example, illustrative types of hardware that may be used include field programmable gate arrays (FPGAs), application-specific integrated circuits (ASICs), application specific standard products (ASSPs), systems-on-chip (SOC), complex programmable logic devices (CPLD) and so on. The described units or modules may also be arranged in a processor. The names of these units or modules are not, in some cases, considered as a limitation to the units or modules.

At least some embodiments of the present disclosure also provide a computer-readable storage medium, which stores a computer program, and when the computer program is executed by a processor, the image data processing method provided by the foregoing method embodiments is implemented.

Figure 12:
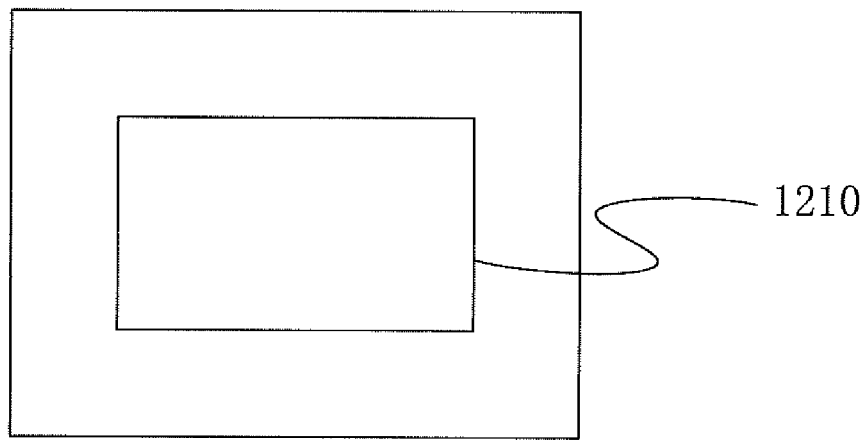
FIG. 12 is a schematic diagram of a display device provided by at least some embodiments of the present disclosure.

At least some embodiments of the present disclosure also provide a display device. As shown in FIG. 12, a display device 1200 according to at least some embodiments of the present disclosure includes an image data processing apparatus 1210 as described in any one of the above embodiments. The display device 1200 may be: any product or component having a display function such as a display, a liquid crystal television, an OLED television, an electronic paper, a mobile phone, a tablet computer, a notebook computer, a digital photo frame, a navigator. The display device 1200 may further include other conventional components such as a display panel, which is not limited in the embodiments of the present disclosure.

Figure 13:
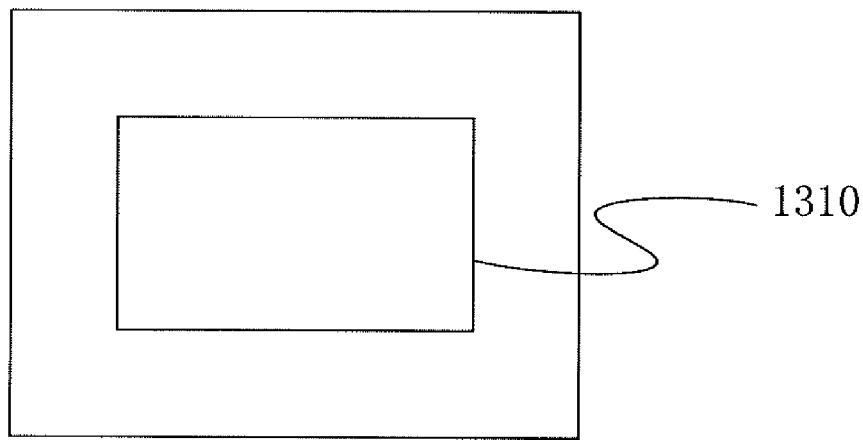
FIG. 13 is a schematic diagram of a display device provided by at least some embodiments of the present disclosure.

At least some embodiments of the present disclosure also provide a display device. As shown in FIG. 13, a display device 1300 according to at least some embodiments of the present disclosure includes an image display apparatus 1310 as described in any one of the above embodiments. The display device 1300 may be: any product or component having a display function such as a display, a liquid crystal television, an OLED television, an electronic paper, a mobile phone, a tablet computer, a notebook computer, a digital photo frame, a navigator. The display device 1300 may further include other components such as a processor, which is not limited in the embodiments of the present disclosure.

It should be noted that the method embodiments provided by at least some embodiments of the present disclosure may be cross-referenced with corresponding device embodiments, which are not limited in the embodiments of the present disclosure. The order of the steps of the method embodiments provided by the embodiments of the present disclosure may be appropriately adjusted, and steps may be added or deleted according to the situation. Changes that can be readily contemplated by any person skilled in the art within the technical scope disclosed in this disclosure should all be covered by the protection scope of the present disclosure, so they will be omitted herein.

Those skilled in the art will readily contemplate other embodiments of the present disclosure after considering the specification and practicing the invention disclosed herein. This application is intended to cover any variations, uses, or adaptations of the present disclosure that follow the general principles of the present disclosure and include common general knowledge or conventional technical means in the technical field that the present disclosure has not invented. It is intended that the specification and examples be considered to be exemplary only, with the true scope and spirit of the disclosure being indicated by the following claims.

The foregoing is merely a description of exemplary embodiments of the disclosure, and not intended to define the scope of the disclosure, and the scope of the disclosure is determined by the appended claims.

What is claimed is:

1. An image data processing method, comprising:
    obtaining initial image data of a to-be-displayed image, wherein each pixel in the to-be-displayed image comprises a white sub-pixel and a plurality of color sub-pixels;
    determining a target stimulus value corresponding to each pixel based on the initial image data, wherein the target stimulus value corresponding to each pixel is negatively correlated with color saturation of each pixel; and
    updating the initial image data to obtain target image data, wherein a stimulus value of the white sub-pixel of each pixel in the target image data is the target stimulus value corresponding to each pixel.

2. The method according to claim 1, wherein prior to updating the initial image data to obtain the target image data, the method further comprises:
    determining an auxiliary stimulus value corresponding to each color sub-pixel in each pixel, wherein the auxiliary stimulus value corresponding to each color sub-pixel is less than a stimulus value of each color sub-pixel in the initial image data; and a stimulus value of each color sub-pixel in the target image data is the auxiliary stimulus value corresponding to each color sub-pixel.

3. The method according to claim 2, wherein the determining the auxiliary stimulus value corresponding to each color sub-pixel in each pixel comprises:
    determining the auxiliary stimulus value G corresponding to each color sub-pixel according to a third preset formula, wherein the third preset formula is $$G = E - F \times \left(\frac{S}{Smax}\right),$$

where E is the stimulus value of each color sub-pixel in the initial image data, and S is the color difference of each pixel, Smax is a maximum color difference of pixels in the to-be-displayed image, and F is the target stimulus value.

4. The method according to claim 1, wherein the determining the target stimulus value corresponding to each pixel based on the initial image data comprises:
obtaining a stimulus value of each color sub-pixel in each pixel in the initial image data;
determining a maximum initial stimulus value M and a minimum initial stimulus value C of the color sub-pixels in each pixel;
determining a color saturation coefficient K of each pixel based on a color difference of each pixel, wherein the color saturation coefficient K of each pixel is negatively correlated with the color difference of each pixel, and the color difference of each pixel is positively related to the color saturation of each pixel; and
determining the target stimulus value F corresponding to each pixel according to a first preset formula, wherein the first preset formula is $$F = \frac{C^2}{M}K,$$

and the determining the color saturation coefficient K of each pixel based on the color difference of each pixel comprises:
determining the color saturation coefficient K of each pixel according to a second preset formula, wherein the second preset formula is:

$$K = 1 - \frac{S}{Smax},$$

where S is the color difference of each pixel, and Smax is a maximum color difference of pixels in the to-be-displayed image.

5. The method according to claim 1, further comprising:
performing a white balance adjustment on the target image data.

6. An image display method, comprising:
displaying the to-be-displayed image based on the target image data obtained by the image data processing method according to any one of claim 1.

7. An image display apparatus, configured to display the to-be-displayed image based on the target image data obtained by the image data processing method according to claim 1.

8. A display device, comprising the image display apparatus according to claim 7.

9. A non-volatile computer-readable storage medium, storing a computer-readable program executable by a processor, and the computer-readable program, when executed by the processor, causes the processor to perform the image data processing method according to claim 1.

10. An image data processing apparatus, comprising:
an obtaining module, configured to obtain initial image data of a to-be-displayed image, wherein each pixel in the to-be-displayed image comprises a white sub-pixel and a plurality of color sub-pixels;
a first determining module, configured to determine a target stimulus value corresponding to each pixel based on the initial image data, wherein the target stimulus value corresponding to each pixel is negatively correlated with the color saturation of each pixel; and
an updating module, configured to update the initial image data to obtain target image data, wherein a stimulus value of the white sub-pixel of each pixel in the target image data is the target stimulus value corresponding to each pixel.

11. The apparatus according to claim 10, further comprising:
a second determining module, configured to determine an auxiliary stimulus value corresponding to each color sub-pixel in each pixel, wherein the auxiliary stimulus value corresponding to each color sub-pixel is less than a stimulus value of each color sub-pixel in the initial image data; and a stimulus value of each color sub-pixel in the target image data is the auxiliary stimulus value corresponding to each color sub-pixel.

12. The apparatus according to claim 10, wherein the first determining module comprises:
an obtaining unit, configured to obtain a stimulus value of each color sub-pixel in each pixel in the initial image data;
a first determining unit, configured to determine a maximum initial stimulus value M and a minimum initial stimulus value C of the color sub-pixels in each pixel;
a second determining unit, configured to determine a color saturation coefficient K of each pixel based on a color difference of each pixel, wherein the color saturation coefficient K of the pixel is negatively related to the color difference of the pixel, and the color difference of the pixel is positively related to the color saturation of the pixel; and
a third determining unit, configured to determine the target stimulus value F corresponding to each pixel according to a first preset formula, wherein the first preset formula is $$F = \frac{C^2}{M}K,$$

and
the second determining unit is further configured to determine the color saturation coefficient K of each pixel according to a second preset formula, wherein the second preset formula is $$K = 1 - \frac{S}{Smax},$$

where S is the color difference of each pixel, Smax is a maximum color difference of the pixels in the to-be-displayed image..

13. The apparatus according to claim 10, further comprising:
an adjusting unit, configured to perform a white balance adjustment on the target image data.

14. An image data processing apparatus, comprising:
a processor; and
a memory,
wherein the memory stores computer-readable instructions executable by the processor, and the computer-readable instructions, when executed, cause the processor to perform following operations:
obtaining initial image data of a to-be-displayed image, wherein each pixel in the to-be-displayed image comprises a white sub-pixel and a plurality of color sub-pixels;

determining a target stimulus value corresponding to each pixel based on the initial image data, wherein the target stimulus value corresponding to each pixel is negatively correlated with color saturation of each pixel; and updating the initial image data to obtain target image data, wherein a stimulus value of the white sub-pixel of each pixel in the target image data is the target stimulus value corresponding to each pixel.

15. The image data processing apparatus according to claim 14, wherein prior to updating the initial image data to obtain the target image data, the processor further performs:

determining an auxiliary stimulus value corresponding to each color sub-pixel in each pixel, wherein the auxiliary stimulus value corresponding to each color sub-pixel is less than a stimulus value of each color sub-pixel in the initial image data; and a stimulus value of each color sub-pixel in the target image data is the auxiliary stimulus value corresponding to each color sub-pixel.

16. The image data processing apparatus according to claim 15, wherein the determining the auxiliary stimulus value corresponding to each color sub-pixel in each pixel comprises:

determining the auxiliary stimulus value G corresponding to each color sub-pixel according to a third preset formula, wherein the third preset formula is $$G = E - F \times \left(\frac{S}{Smax}\right),$$

where E is the stimulus value of each color sub-pixel in the initial image data, and S is the color difference of each pixel, Smax is a maximum color difference of pixels in the to-be-displayed image, and F is the target stimulus value.

17. The image data processing apparatus according to claim, wherein the determining the target stimulus value corresponding to each pixel based on the initial image data comprises:

obtaining a stimulus value of each color sub-pixel in each pixel in the initial image data;

determining a maximum initial stimulus value M and a minimum initial stimulus value C of the color sub-pixels in each pixel;

determining a color saturation coefficient K of each pixel based on a color difference of each pixel, wherein the color saturation coefficient K of each pixel is negatively correlated with the color difference of each pixel, and the color difference of each pixel is positively related to the color saturation of each pixel; and determining the target stimulus value F corresponding to each pixel according to a first preset formula, wherein the first preset formula is $$F = \frac{C^2}{M} K.$$

18. The image data processing apparatus according to claim 17, wherein the determining the color saturation coefficient K of each pixel based on the color difference of each pixel comprises:

determining the color saturation coefficient K of each pixel according to a second preset formula, wherein the second preset formula is:

$$K = 1 - \frac{S}{Smax},$$

where S is the color difference of each pixel, and Smax is a maximum color difference of pixels in the to-be-displayed image.

19. The image data processing apparatus according to claim 14, wherein the processor is further configured to perform a white balance adjustment on the target image data.

20. A display device, comprising the image data processing apparatus according to claim 14.

* * * * *